July 19, 1932.　　　A. G. RAYBURN　　　1,867,678
DRIVE MECHANISM FOR MOTOR VEHICLES
Filed Jan. 10, 1927　　12 Sheets-Sheet 1
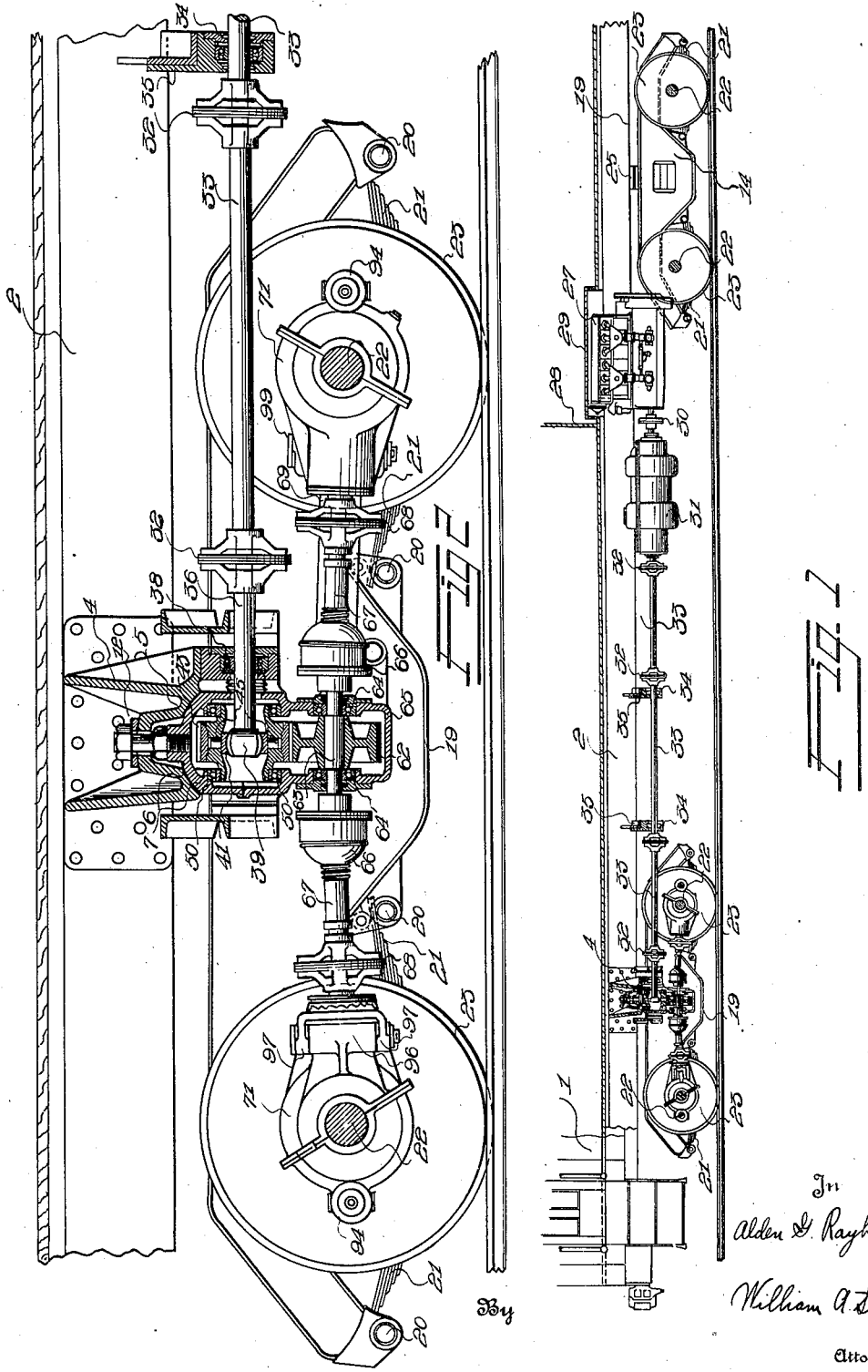
Inventor
Alden G. Rayburn
By William A. Strauch
Attorney

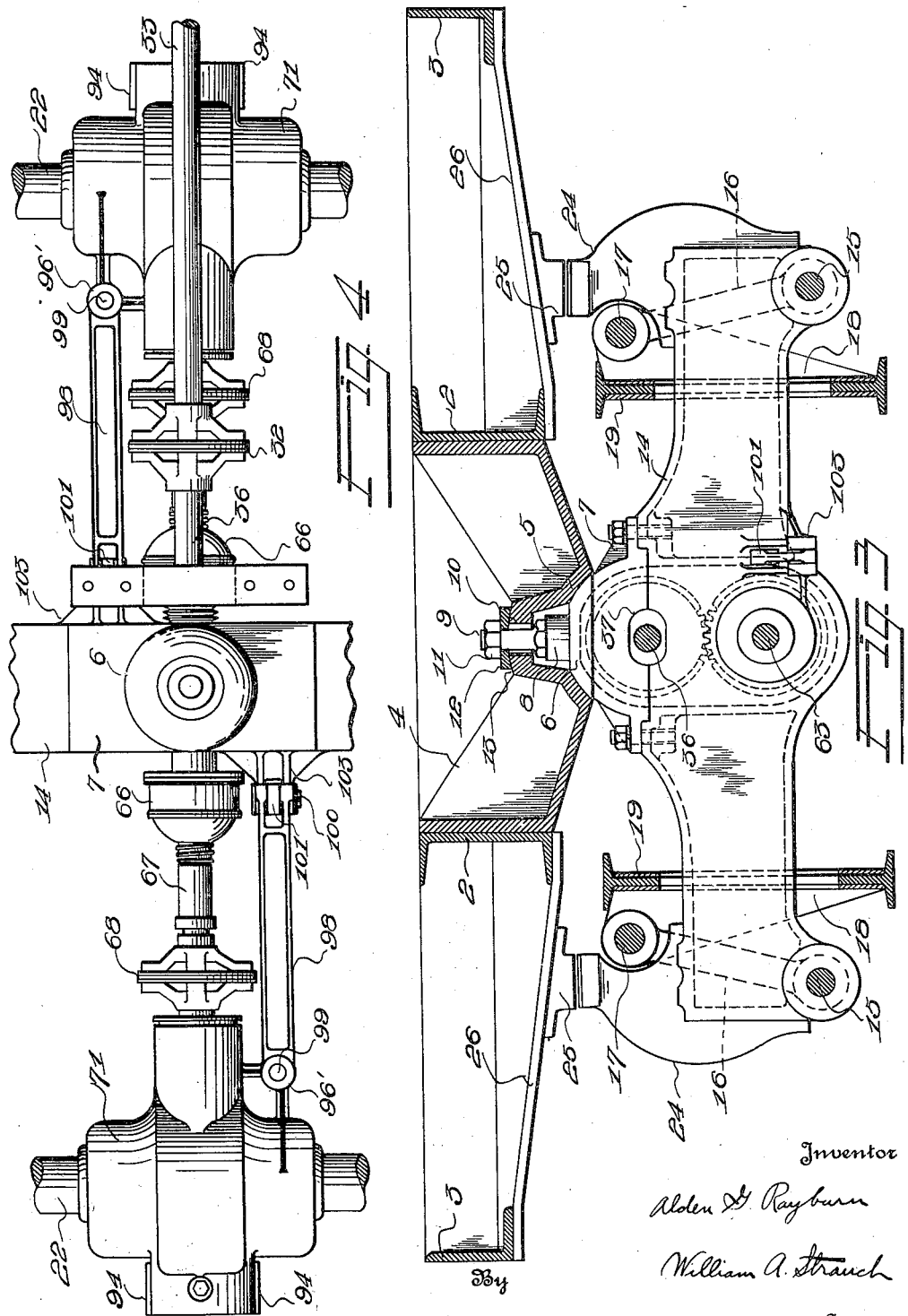

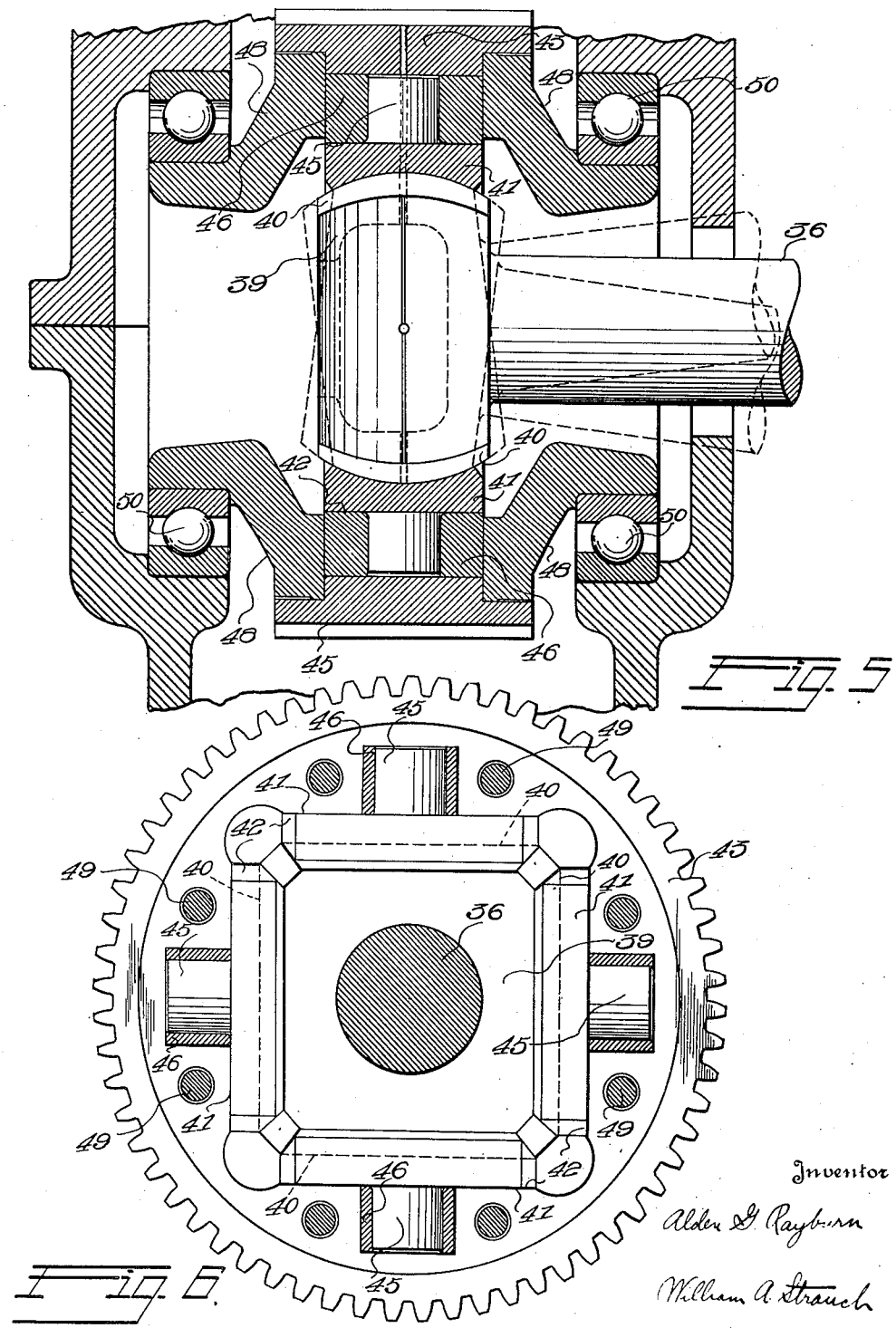

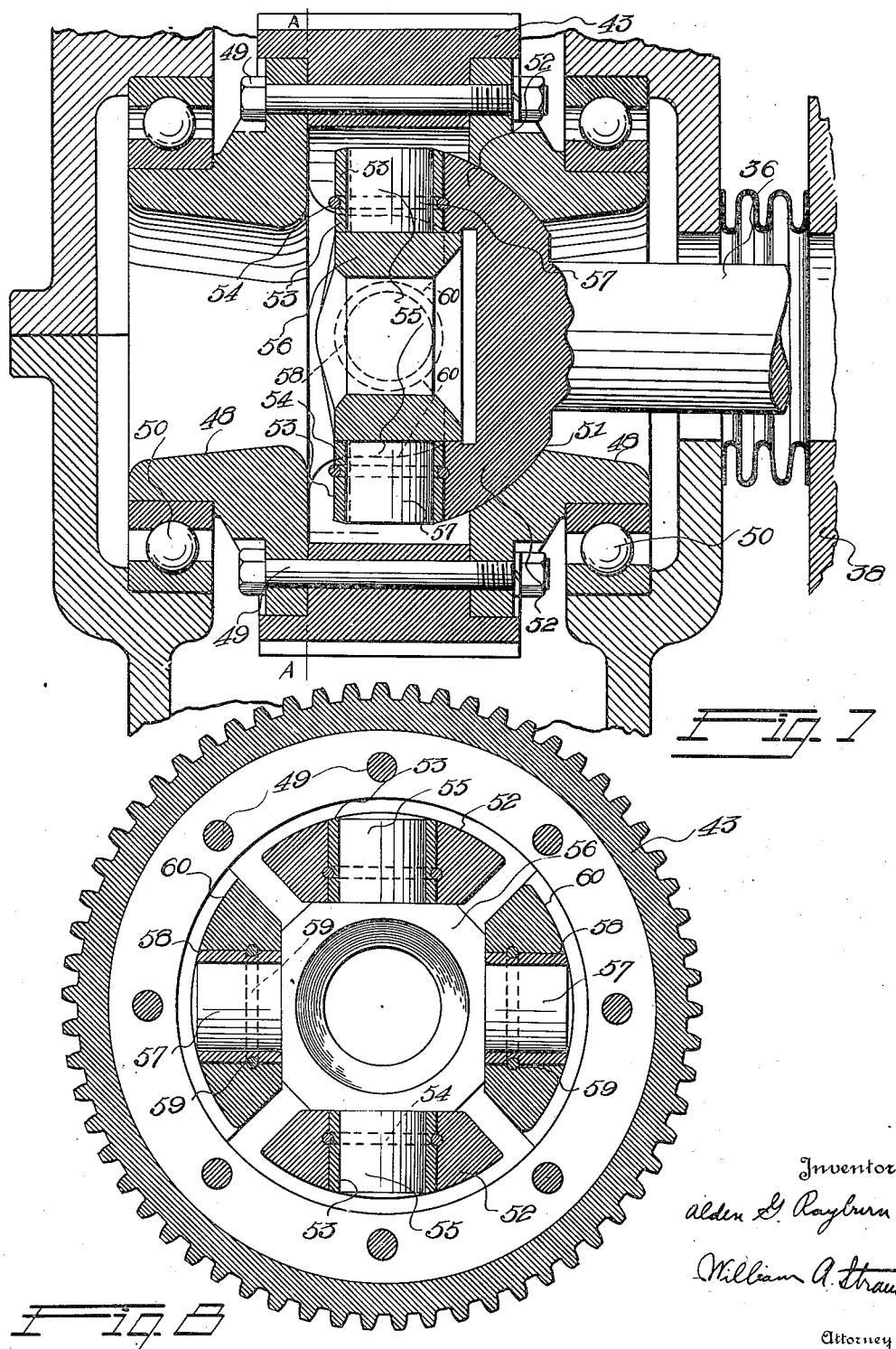

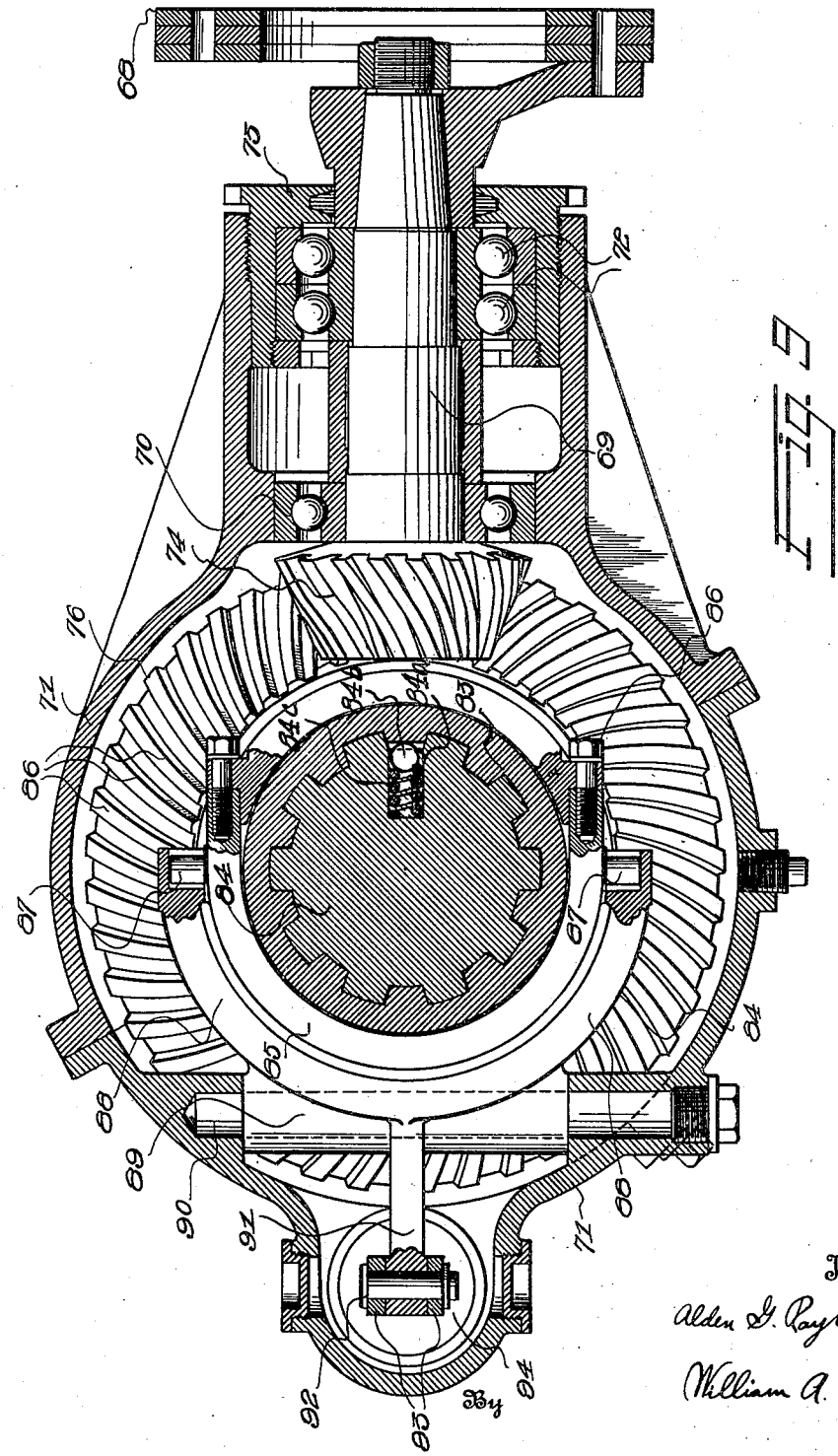

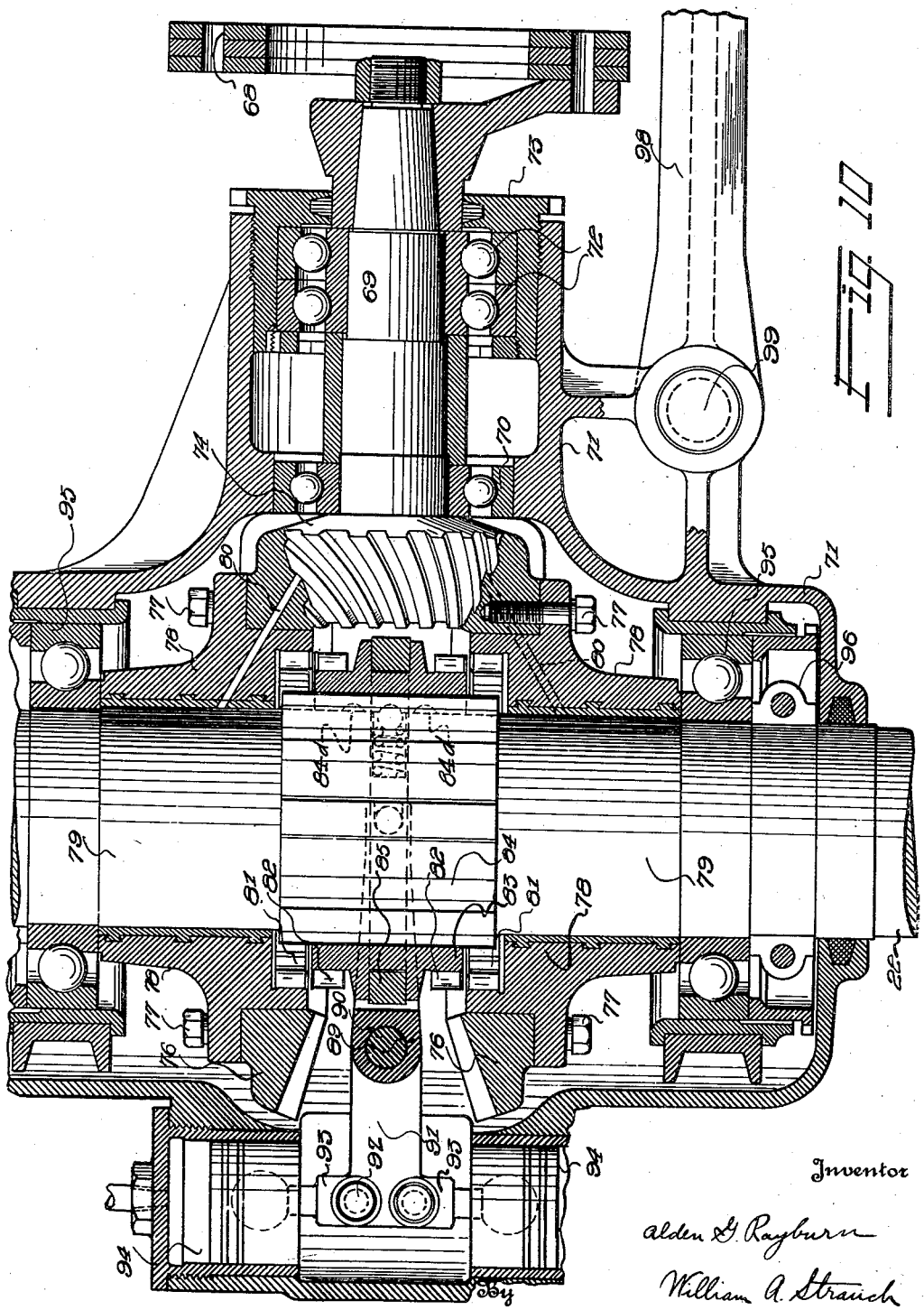

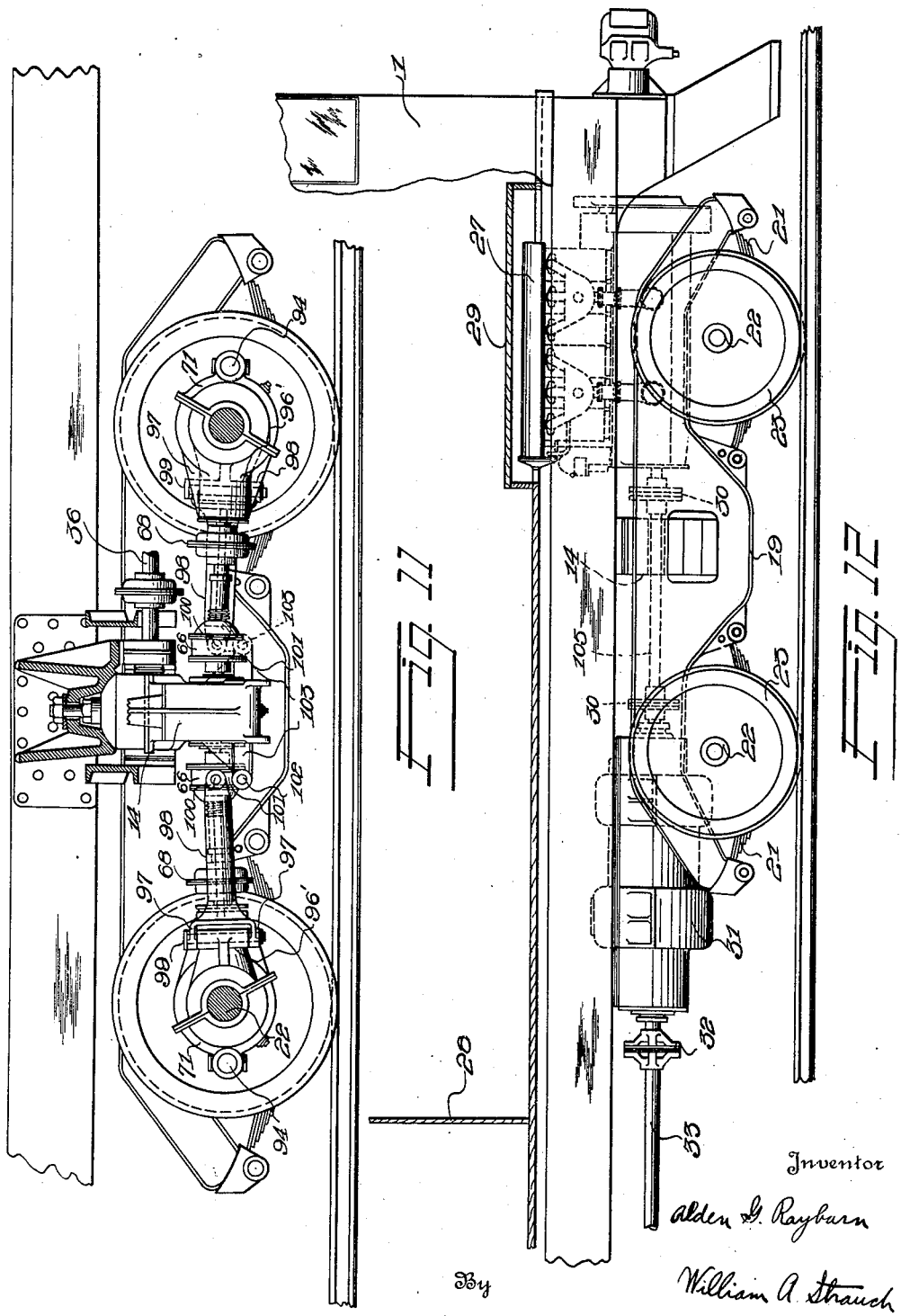

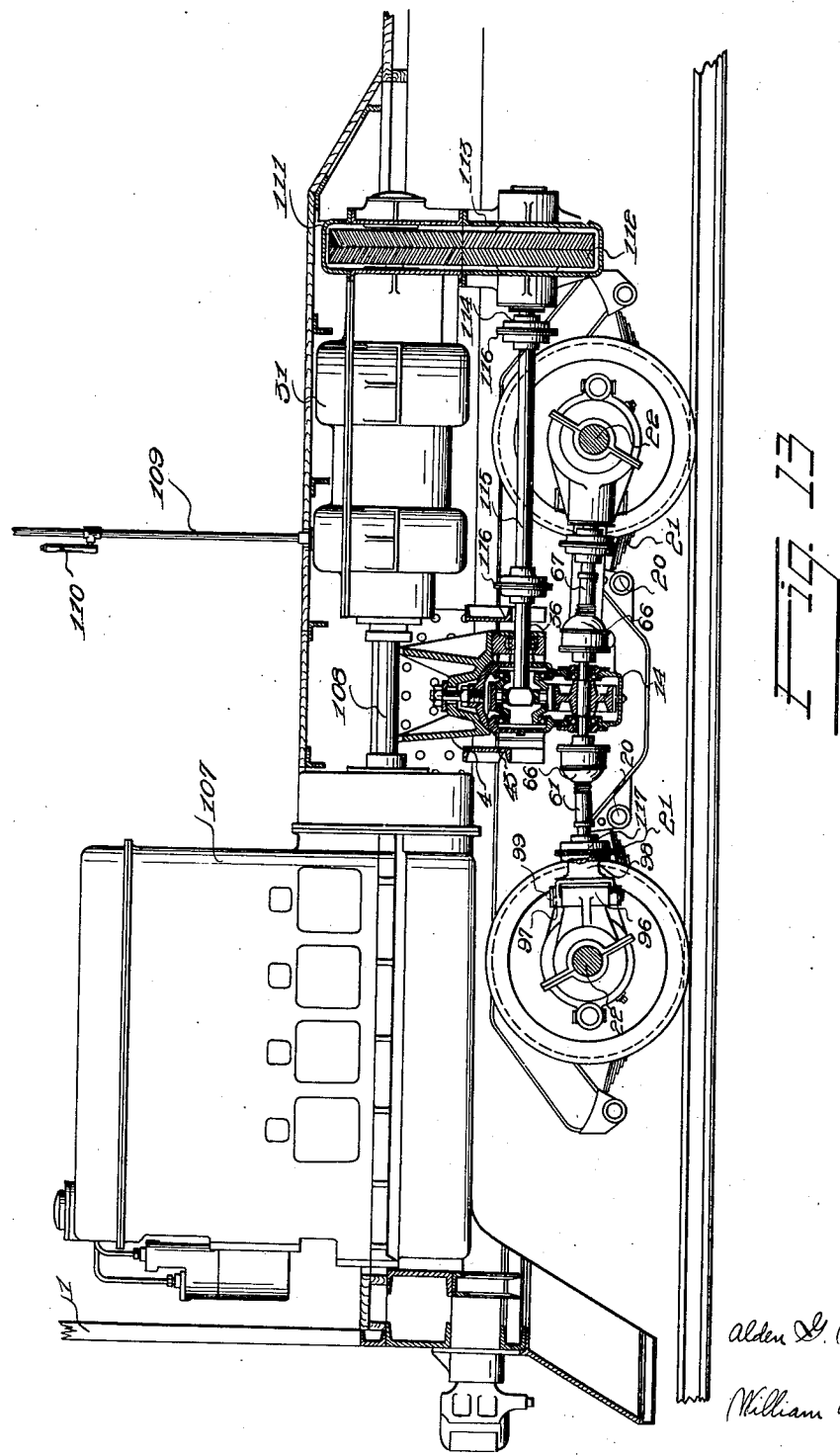

July 19, 1932.  A. G. RAYBURN  1,867,678
DRIVE MECHANISM FOR MOTOR VEHICLES
Filed Jan. 10, 1927   12 Sheets-Sheet 9
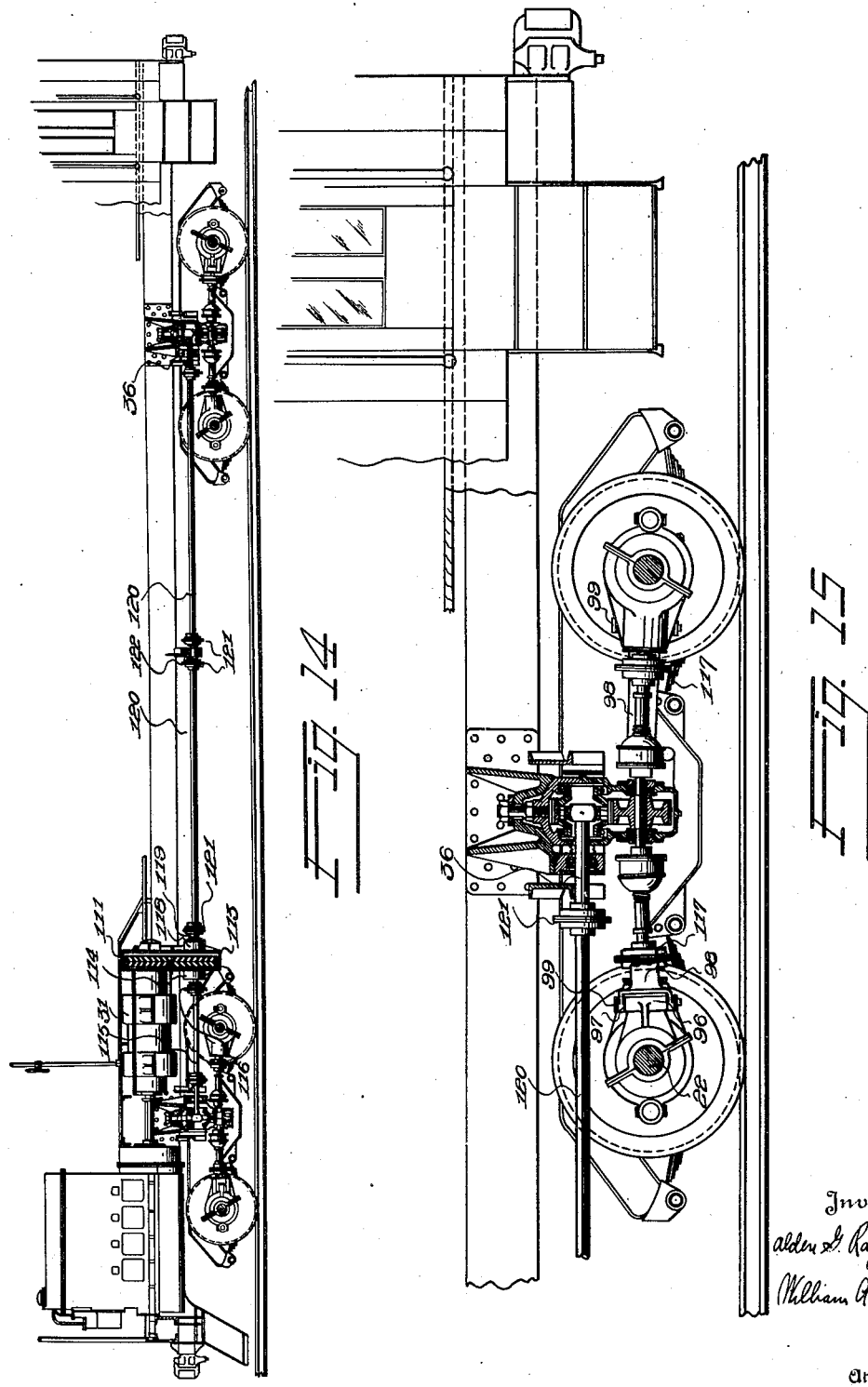

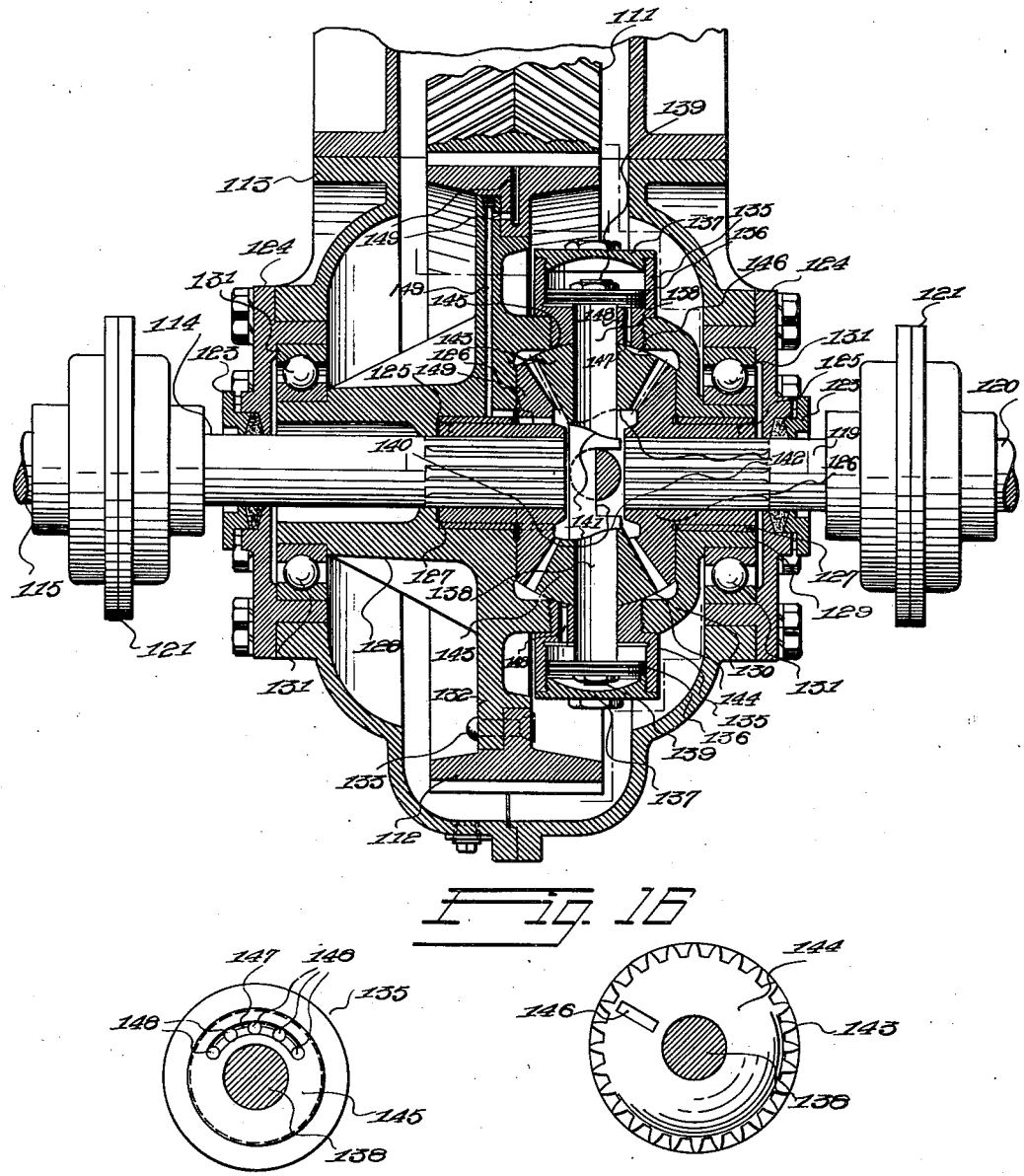

July 19, 1932.   A. G. RAYBURN   1,867,678
DRIVE MECHANISM FOR MOTOR VEHICLES
Filed Jan. 10, 1927    12 Sheets-Sheet 11
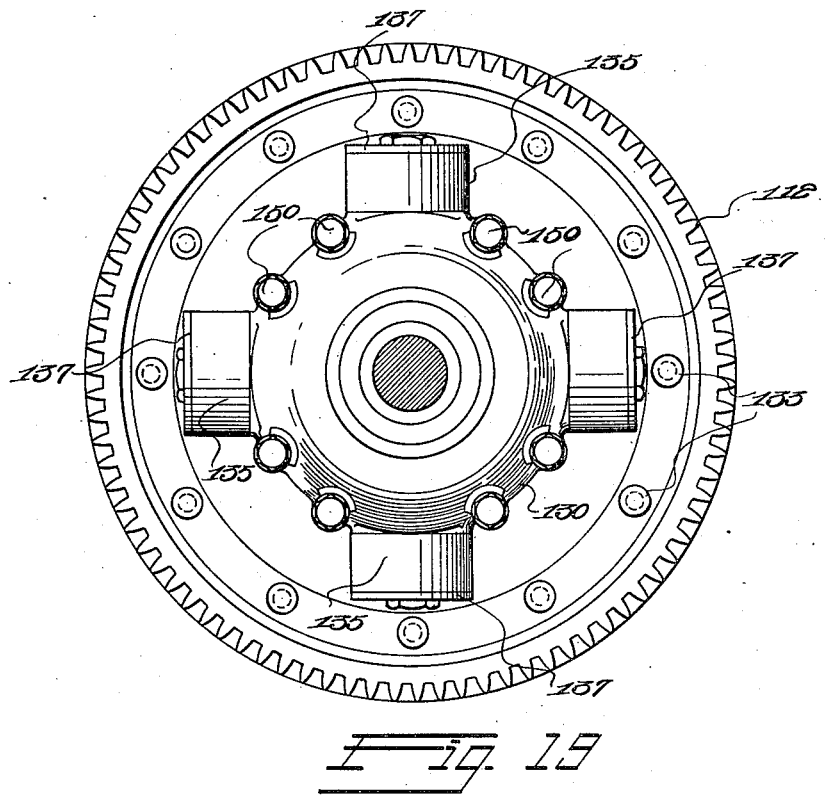
Fig. 19
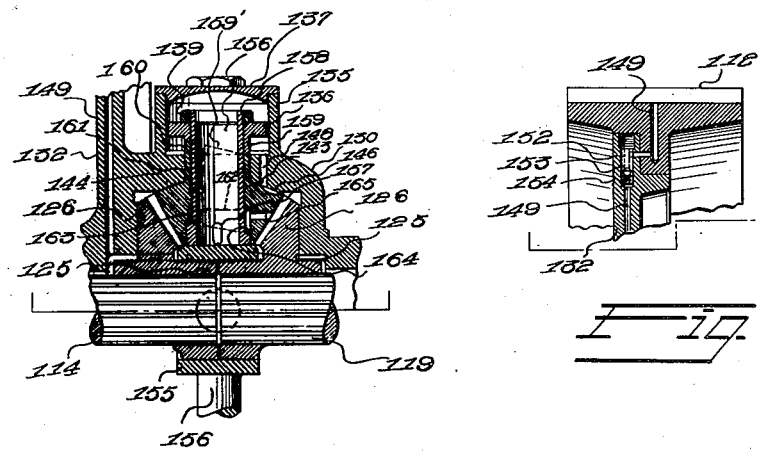
Fig. 20
Fig. 21
Inventor
Alden G. Rayburn
William A. Strauch
By
Attorney

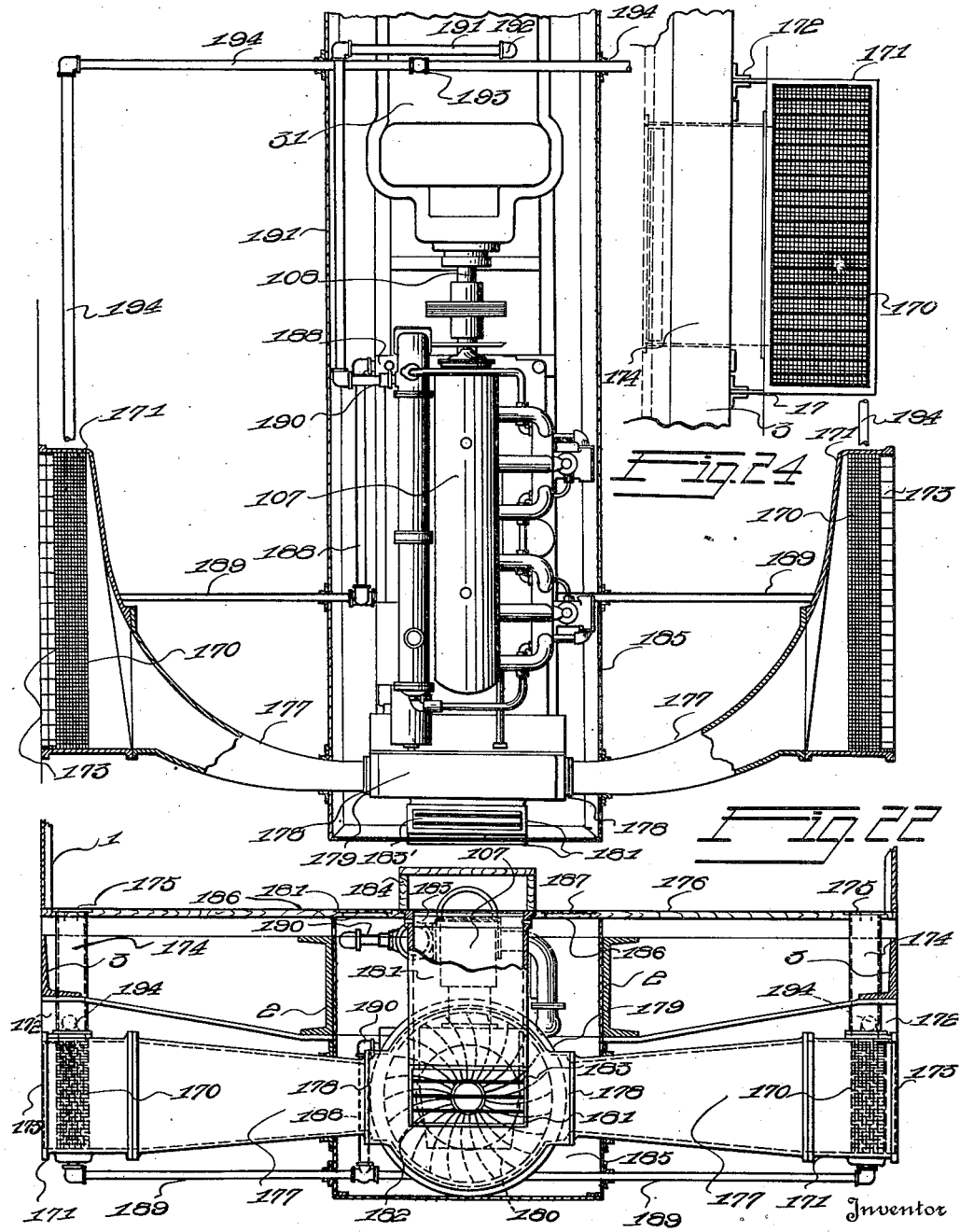

Patented July 19, 1932

1,867,678

UNITED STATES PATENT OFFICE

ALDEN G. RAYBURN, OF SAUSALITO, CALIFORNIA, ASSIGNOR, BY MESNE ASSIGNMENTS, TO AUTOMOTIVE ENGINEERING CORPORATION, A CORPORATION OF DELAWARE

DRIVE MECHANISM FOR MOTOR VEHICLES

Application filed January 10, 1927. Serial No. 160,230.

The present invention relates to drive mechanisms for motor vehicles, and more particularly the invention relates to improved constructions for railway motor coaches, locomotives, automobiles, and like motor vehicles.

Various forms of drive mechanisms for railway motor coaches with flexible trucks have been proposed in which the driving motor or motors have been mounted in the car body, but such proposed constructions have not provided satisfactory compensating means in the drive connections between the trucks for necessary relative universal motions of the trucks and the car body under service conditions. Direct gearing between the motor trucks has heretofore been impractical in such vehicles because the relative movement of the trucks and body causes destructive shocks in the gearing, and where vertical drive shafts are utilized, undesirable turning reactions tending to throw the trucks off the track are developed.

To eliminate these undesirable features of direct gear connections, flexible drive connections between the driving motor and the truck have been proposed in which angular splined or telescopic propeller shafts reach from the driving connections or gearing in the car body to the driving mechanism of a truck. Because of the motion in the splined connections due to relative movement of the trucks and body, and due to the relatively great powers which must be transmitted through the angular joints and splined connections resulting in destructive shocks and whipping of shaft lengths, this type of drive rapidly deteriorates with the resulting increased maintenance costs.

To overcome the difficulty introduced due to the shaft angularity, spline movement, and whipping of the driving or propeller shaft sections, various arrangements of independent motors on the driven trucks have been proposed. While these arrangements have been found to be operative for electric motor and internal combustion drives of smaller powers, when an effort is made to provide motors for the relatively heavier powers it is found that there is not sufficient room for mounting the larger motors on the trucks, and at the same time to maintain a reasonable height of the vehicle from the ground or track level.

Accordingly, an object of the invention is to provide a drive for railcars, locomotives, and like vehicles, in which angular and whipping drive shaft sections are eliminated while at the same time provision is made for universal movement of the trucks with relation to the car body, without introducing shocks or undesirable turning reactions in the truck or driving mechanisms under service conditions. The most desirable form of internal combustion engines for rail vehicle drive purposes are Diesel engines, which are relatively low in speed, large in size, and develop power in cyclic pulses. The inherent pulsation of power in Diesel engines has heretofore precluded the use of direct gear transmission of power from the engine due to the destructive shocks caused by the inherent vibration. Various flexible couplings to absorb this shock and permit the use of direct gear transmission of the power have been proposed, but such proposed arrangements have not been satisfactory. As a result, for the transmission of larger powers with Diesel engines it has been the practice to utilize electrical transmission which is unsatisfactory because of inefficiency, high initial cost and maintenance, and excessive weights. It has also been the practice to make Diesel engines of such large size that sufficient torque is developed by the engine to avoid the necessity for reduction gearing and in locomotives transmission of power from the engine to the wheels by cranks and connecting rods has been utilized.

Another object of the present invention is to provide power transmission arrangements for Diesel engine drives suitable for propulsion of motor vehicles, ships, and the like, whereby the power is transmitted from relatively small higher speed Diesel engines to a final drive shaft without destructive shocks to gearing.

A rail car or locomotive must exert substantially its maximum tractive efforts to start, and at low speed to overcome the inertia and to accelerate its movement and the movement of trailers or a train which may be drawn thereby. In Diesel or other types of internal combustion engines the torque of the engine is substantially a function of the speed, the engine developing its maximum torque at high speed. In order that Diesel or internal combustion engines may be used in a locomotive or rail car a variable speed transmission must be interposed between the engine and the drive trucks, so that in starting, the traction wheels will start at a low speed while the engine is developing its maximum torque.

Still another object of the invention is to provide a locomotive or railcar driven by a relatively high powered internal combustion engine in which suitable arrangements for varying the speed of the locomotives are provided independently of the speed variations of the driving motor.

Owing to the possible variations in wheel diameters of independent trucks due to differences in initial size and to wear in service, it has been heretofore found impractical to drive a plurality of trucks from a single engine because of the destructive stresses set up in the driving connections due to difficulty in distribution of power. It has been proposed to introduce compensating differentials between the driving trucks such as are commonly used in multi-wheel road vehicles to compensate for variations of this character between tandem driven axles. This method of compensation is more or less satisfactory in road vehicle drives because of the minimized tendency for the wheels to slip by the use of pneumatic tires. In railway drives a greater tendency for the driving wheels to slip exists and when ordinary differential mechanisms are utilized to compensate between the trucks, when one set of driven wheels slips, a substantially complete loss of traction results. As a result efforts have been made to drive only one truck of a railcar or locomotive from a single engine. Where a plurality of driving engined trucks are utilized synchronization of the independent engines and transmissions presents serious operating difficulties.

A further object of the invention is to provide novel compensating mechanisms by use of which loss of traction due to slipping of the driving wheels is substantially eliminated and which is applicable to drive mechanisms between the independent trucks of a railcar driven from a single prime mover to tandem driven axles of multi-wheel road vericles, and to differentiation of power between differentially driven axle shafts of differentially driven motor vehicle axles.

In the operation of internal combustion engine driven railway vericles, and in railway vehicles embodying hydraulic transmissions of certain types, maintenance of the engine and transmission at proper temperatures for efficient working becomes essential. It is the practice to provide water circulation systems with cooling radiators through which air is drawn by an engine driven fan for the purpose of cooling internal combustion engines. In accordance with usual methods of mounting the engines and cooling radiators on a vehicle, both are more or less exposed to the elements so that a tendency exists to clog the radiator and to impair the efficiency of the engine and radiator by accumulations of ice, snow, dirt, and making the engine difficult to start in cold weather.

Still another object of the invention is to provide novel arrangements for maintaining proper operating temperatures of internal combustion engines and hydraulic transmissions as well as easy starting conditions independently of the weather encountered, and to provide novel and efficient cooling arrangements.

Still further objects of the invention will appear in the following detailed description of the preferred embodiments thereof, and are such as may be attained by the various combinations, sub-combinations, and principles hereinafter set forth, and as are defined by the terms of the appended claims.

As shown in the drawings:

Figure 1 is a more or less diagrammatic side elevation partially in section, showing one preferred form of my invention.

Figure 2 is a sectional side elevation with parts broken away showing the preferred form of driving construction utilized in the preferred forms of my invention.

Figure 3 is a transverse sectional view showing the method of supporting the truck bolster and car body on the form of truck shown in Figure 2.

Figure 4 is a fragmental plan view with parts removed of the driving arrangement shown in Figure 2.

Figure 5 is a detailed longitudinal sectional view of a preferred form of universal drive connection between the propeller shaft end section and the truck supported gearing.

Figure 6 is a side elevation partially in section and with parts removed of the mechanism shown in Figure 5.

Figure 7 is a detailed transverse sectional view of a modified form of connection between the propeller shaft end section and the truck supported gearing.

Figure 8 is a transverse sectional view taken along line A—A of Figure 7.

Figure 9 is a detailed vertical sectional view with parts broken away showing a preferred form of driving axle utilized in the preferred forms of railcars embodying my invention.

Figure 10 is a sectional plan view with parts broken away, of the axle mechanism shown in Figure 9.

Figure 11 is a side elevation partially in section and with parts broken away of the driving truck shown in Figure 2.

Figure 12 is a fragmental side elevation partially in section showing a modified form of my invention applied to a rail car with a single driven truck.

Figure 13 is a fragmental side elevation partially in section of another modification of my invention applied to a rail car with a single driven truck.

Figure 14 is a side elevation partially in section of further modification of my invention applied to a railcar in which a plurality of independent trucks are driven.

Figure 15 is a sectional side elevation of the rear driving truck in the form of invention shown in Figure 14.

Figure 16 is a detailed vertical longitudinal section showing a preferred compensating mechanism for use with the form of invention shown in Figure 14, and useful in independent relations as a power differentiating mechanism.

Figure 17 is a detailed view partially in section of a cylinder porting arrangement utilized in the form of invention shown in Figure 16.

Figure 18 is an end view of the differential pinions utilized in the form of invention shown in Figure 16.

Figure 19 is a side elevation of the essential parts of the form of device shown in Figure 16.

Figure 20 is a fragmental view of a modification of the mechanism shown in Figure 16.

Figure 21 is a detailed sectional view showing the essential parts of a further modification of the form of invention shown in Figure 16.

Figure 22 is a more or less diagrammatic plan view partially in section, of a preferred temperature control system for an internal combustion engine and hydraulic transmission for use in my invention.

Figure 23 is a front elevation of the form of invention shown in Figure 22.

Figure 24 is a fragmental side elevation of the form of invention shown in Figure 22.

Referring to the drawings, car body 1 (Figure 1) is supported on a suitable frame-work comprising longitudinal channel members 2 (Figure 3) and longitudinal frame side members 3 connected by suitable end members to form a rigid supporting structure for the body. Secured to channels 2 at the forward and rear ends of the car by rivets or in any other suitable manner are car bolsters 4. Formed in each car bolster 4 is a cupped seating member 5 which rests upon and engages the spherical seating surface 6 of truck bolster cap 7. Threaded into central extension 8 of cap 7 is the pivot stud 9 which extends through opening 10 of the car bolster 4. Threaded on the upper end of stud 9 is a nut 11 which holds cap 12 provided with a lower spherical surface, in position with the spherical surface thereof, engaging a coacting spherical surface 13 of body bolster 4. Surfaces 5, 6 and 13 have a common center about which universal movements of the body and truck occur. Cap 7 is secured in position on truck bolster 14 which is pivotally secured by means of the pins 15 to the lower ends of the swinging links 16. Swinging links 16 at their upper ends are pivotally hung from pins 17 which in turn are supported in brackets 18 secured to truck side frame members 19. Side frame members 19 are connected at 20 (Figure 2) to the ends of leaf springs 21 and leaf springs 21 are supported from axles 22 in well known manner. Axles 22 are secured at their outer ends to and are supported by wheels 23. Secured to the ends of truck bolsters 14 are castings 24 provided with upper surfaces adapted to be engaged by the lower surfaces of stop castings 25. Castings 25 are secured to and supported from the car frame by suitable supporting members 26.

It will be seen that the mechanism so far described provides means for supporting the car body from swingingly mounted truck bolsters and permits universal movement of the car body and supporting it with relation to the truck about the center of the surfaces 5 and 6 located within truck bolsters 14. As shown in Figure 1, an internal combustion engine 27 is supported from the supporting framework for the car body, and is located just back of the forward car truck with the top thereof extending into the baggage compartment 28 of the car, and accessible by removing a cover 29 provided in the baggage compartment. Engine 27 is preferably a relatively high speed engine, and is connected through flexible coupling 30 to the driving shaft of a variable speed transmission 31. Transmission 31 may be of any suitable type, but is preferably a differential hydraulic transmission of the general type shown in my copending application Serial No. 132,585, filed August 30, 1926. The tail shaft of transmission 31 is connected by flexible couplings 32 to the propeller shaft sections 33. The central shaft section 33 is supported in an anti-friction bearing 34 (Figures 1 and 2) which in turn is mounted in suitable supporting castings 35 secured to the car body supporting frame work. The rear flexible coupling 32 is conected to one end of a propeller shaft section 36 which extends through a slot 37 formed in the bolster 14 and bolster cap 7 (see Figure 3) and is supported in an anti-friction self aligning bearing 38 (Figure 2) suitably supported and attached to the car bolster casting 4. Formed on the end of shaft section 36 is a universal drive section 39 (Figures 2, 5 and 6) which is provided with four cylindrical driving surface areas 40 centered about axes at right angles to each other and intersecting the center or neutral point of motion between the car body and truck. Seated against the surfaces 40 of driving member 39 are coacting inner cylindrical surfaces of driving shoes 41, the outer planed surfaces of which abut against plane surfaces 42 of a driving gear 43. Shoes 41 are each provided with a centering trunnion 45 journaled in a trunnion block 46. Trunnion blocks 46 are mounted in suitable slots formed in the web of gear 43 and are held in position by means of the supporting castings 48 which are bolted to gear 43 by means of securing bolts 49. Castings 48 are provided with cylindrical extensions journaled in anti-friction bearings 50 which in turn are mounted in truck bolster 14 of the driven truck, (see Figure 2), in such manner that the center of universal movement of the driving section 39 with relation to gear 43 coincides with the center of universal movement of the truck with relation to the car body. By this construction it will be seen that the shaft sections 36 and 33 are supported from and movable with the car body, with their axes of rotation substantially aligned and intersecting the neutral point of motion between the truck and body, while driving gear 43 is supported in and is movable with the truck bolster. A driving connection is accordingly established between the gear 43 and shaft 36 at a neutral point of motion between the truck and the car body without the use of angular or splined shafts. Substantially no tendency of shaft section 36 to whip exists due to the fact that the axis of rotation thereof is substantially fixed with relation to the car body. The elimination of angularity and splined connections in shaft 36 and of the oscillation thereof by this arrangement is an important feature of my invention.

Instead of the form of universal joints shown in Figures 5 and 6, a modified construction such as shown in Figures 7 and 8 may be utilized. In this form of joint, propeller shaft section 36 has formed integrally with the end thereof a drive member 51 provided with a spherical bearing surface and a pair of oppositely disposed jaw members 52 in which bushings 53 are detachably secured by means of the resilient securing rings 54. Journaled in the bushings 53 are trunnions 55 of a universal drive member 56 opposite sides of which fit slidably between the inner surfaces of jaws 52. Formed integrally with drive member 56 are diametrically opposite trunnions 57 journaled in bushings 58. Bushings 58 in turn are detachably held by split rings 59 (Figure 8) in jaws 60 formed integrally with one of the supporting castings 48 of the gear 43. A cupped spherical seat is formed in the other casting 48 to receive the spherical surface of drive member 51 as shown in Figure 7.

Gear 43 meshes with and drives a gear 62 (Figure 2) supported on and driving shaft 63, in turn being supported in anti-friction bearings 64. Bearings 64 are supported in gear casing section 65 of the truck bolster 14. Secured to the ends of shaft 63 are the universal drive joints 66 and may be of any suitable construction, these joints in turn drive telescopic or splined propeller shaft sections 67. Shaft sections 67 drive flexible coupling members 68 which in turn drive propeller shaft sections 69 of reversing drive axle mechanisms.

Each propeller shaft section 69 is supported in anti-friction bearings 70 and 72 (Figures 9 and 10) which in turn are mounted in housing 71. Bearing 72 is supported in adjustable bearing case 73. Formed integrally with the inner end of shaft section 69 is a spiral bevel drive pinion 74 which meshes with and drives a pair of spiral bevel master gears 76. Gears 76 are secured by means of the studs 77 to supporting spiders 78. Spiders 78 are bored centrally and lined with suitable bearing material such for example as babbitt, and are journaled on bearing sections 79 of axles 22. Lubricant is forced to the bearing surfaces of spiders 78 through suitable ducts 80. Lubricant carried on the teeth of gears 76 is squeezed into the ducts 80 by the meshing action of pinions 74 with the gears 76.

Formed in the spiders 78 are the internal clutch teeth 81 which are adapted to mesh with teeth 82 formed integrally on the clutch member 83. Clutch member 83 is slidably splined to central section 84 of the axle 22 and is adapted to be shifted by means of split actuating ring 85 which has the parts thereof held together by studs 86 (Figure 9) and is nested in an annular recess or channel formed in the clutch member 83. Formed integrally with one section of split ring 85 are trunnions 87 which fit slidably in suitable slots formed in the outer ends of arms 88 of an actuating member 89. Actuating member 89 is journaled on spindle 90 suitably supported in the housing 71, and is provided with operating arm 91, one end of which is connected by means of pins 92 to the center of a pair of actuating links 93. Actuating links 93 are connected at their ends to air or fluid operated pistons mounted in actuating cylinders 94 (Figures 9 and 4). Housing 71 is supported from the axle 22 by means of suitable anti-friction bearings 95 (Figure 10) adjustably mounted in housing 71 and in well known manner and held in proper lateral position by split collars 96. With clutch member 83 positioned as shown in Figure 10 no driving connection will be established between spiders 78 and the axle 22 and in this position of parts the mechanism will be in neutral, while with the clutch member shifted so that the teeth mesh with one or the other of the spiders 78, axles 22 will be driven in a forward or reverse direction. With this mechanism it will accordingly be seen that a mechanical neutral, forward, and reverse driving condition is established in the axles so that a reverse drive need not be provided in transmission 31, making the drive arrangement especially adaptable for my improved hydraulic transmission. In order to hold clutch member 83 in its neutral, forward drive or reverse drive position, the central shaft section is recessed as shown at 84a (Figure 9) to receive a ball 84b pressed outwardly by a spring 84c against the clutch member. Ball 84b is designed to engage one of the shallow notches 84d (Figure 10) a notch being provided for each position of the clutch member. As will be readily understood, ball 84b will serve to hold said member firmly in any one of its positions.

With the mechanical neutral provided, the engine may be warmed up without having to overcome and drag that may exist in the neutral position of the hydraulic transmission. A railcar utilizing a hydraulic transmission is accordingly substantially improved and simplified by the use of the improved reversing axle construction disclosed.

To resist the driving torque reactions on the housings 71 without restricting the flexibility of the truck, and at the same time reduce changes in angularity and spline shaft travel in joints 66 and 68 and shaft section 67 respectively to a minimum, novel torquing arrangements shown in detail in Figures 4 and 11 are provided. Formed integrally with the housings 71 are lugs 96' to which extensions 97 of torque resisting arms 98 are pivotally secured by means of pivot pins 99. At their inner ends the torque arms 98 are pivotally secured by means of pins 100 to the upper ends of links 101. The lower ends of links 101 are secured by pivot pins 102 to supporting brackets 103 formed integrally with the truck bolster 14 in such positions that the axes of pins 100 normally are in substantial alignment with the centers of universal drive joints 66. With this arrangement torque reactions tending to rotate the housings 71 about the axes of axles 22 as a center are transmitted through arms 98 and resisted by the truck bolster brackets 103, while at the same time the connections permit free bodily movement of the axles with the springs as the springs deflect under road conditions, without substantially restricting the flexibility of the truck. It will be apparent that because of the location of the axes of pins 100 in substantial alignment with the centers of the universal drive joints 66 of the axle propeller shafts 67, that the axles will swing substantially about axes passing through centers of universal joints 66 reducing changes in angularity of the joints 66 and 68 and spline travel of shaft 67 to a minimum.

In operation of the form of invention so far described the clutch members 83 in the axles may be shifted to neutral position and the engine 27 started into operation and warmed up. When it is desired to drive the rail car, the transmission is de-clutched and clutch members 83 are shifted into engagement with the proper spider 78 to drive the axles 22 in the desired direction in which it is desired to drive the railcar. The transmission is then controlled to establish the necessary speed reduction to start the car and to maintain it in operation at the desired speed.

In the form of invention so far described, it will be noted that the engine 27 is supported from the car body just back of the forward truck. In Figure 12, the engine 27 is located at the forward end of the car and the transmission 31 is shifted forward so that the weight of the engine and transmission are substantially balanced over the forward truck. This is accomplished by interposing between the transmission and the engine, a shaft section 105 which passes through a slot formed in the bolster 14 of the forward truck so that the flexibility of the forward truck and swinging movement of the bolster are not restricted by the added shaft section. With this arrangement of parts the baggage compartment 28 is left substantially clear, giving a maximum space for baggage storage, and at the same time leaving the engine freely accessible.

Driving arrangements especially adapted for relatively small high speed internal combustion engines have been hereinbefore disclosed in which the engine is small enough to be suspended from the body supporting frame work substantially below the floor level of the car. In the form of invention shown in Figure 13, an engine 107 which may be of larger size, such for example as a Diesel engine is located substantially in the forward end of the car body 1, and is sufficiently high so that the shaft 108 driven thereby passes over the top of the truck bolster 14 to drive transmission 31, which is supported from the car frame work on the opposite side of the car bolster casting 4 substantially balancing the weight of the transmission and the engine over the truck bolster 14. When transmission 31 is of my improved hydraulic type an oil feed pipe 109 and an oil level indicator 110 therefor is provided and is connected to a supply tank located at a point above the transmission. Connected to and driven by the tail or outgoing shaft of the transmission 31 is a herring bone gear 111 which meshes with and drives a gear 112. The gear 112 is suitably supported in a gear casing 113 from the car frame and transmission framework and drives a shaft 114. The driving shaft section 36 for the bolster supported driving gear 43 is driven from the shaft section 114 through the shaft section 115 and flexible metallic drive couplings 116. The driving truck construction is substantially the same as heretofore described, like reference characters being applied to like parts, and a full understanding thereof will be had by reference to the foregoing description of the similar parts.

While the engine 107 may be a relatively small high speed gasoline motor, this arrangement is especially adapted for a Diesel engine drive. Because of the periodic power impulses, delivered by Diesel engines it has heretofore been considered impractical to utilize this type of engine on a rail car with a mechanical speed transmission interposed between the engine and the driving wheels. Prior efforts to adapt Diesel engines for railcar and locomotive propulsion have been confined to electric transmission or have been limited to the transmission of power in rigid wheel base constructions, by connecting rods. With my improved hydraulic transmission interposed between the engine and gearing as disclosed, the impulses of the Diesel engine are smoothed out by the flexibility of the transmission eliminating destructive shocks on the gearing. It will accordingly be seen that a novel Diesel engine drive for railway vehicles is provided.

With my improved arrangements permitting the driving of a flexible rail truck from a Diesel engine mounted in the car body, sufficient power becomes available to permit efficient driving of more than one truck from a single prime mover so that the power driven car may be made sufficiently powerful to draw a train of one or more trailers. It is practically impossible to maintain all of the wheels of a plurality of trucks of the same diameter, and unless special compensating means are provided for ordinary variations of the wheel diameters in contact with the rails, the driving of a plurality of wheels through gearing from a prime mover becomes a practical impossibility because of the destructive stresses introduced in the gearing. If an ordinary differential mechanism is utilized to divide the power between the driven trucks, when one truck encounters a slippery section of track the wheels thereof may slip partly losing their tractive grip on the rails. The slipping wheels will then spin and not all the power will be transmitted to the remaining truck. By providing special compensating means I have been able to adapt the single truck driving arrangements shown in Figure 13 to an efficient and feasible driving arrangement for a railcar with a plurality of driven trucks. For this purpose the arrangement shown in Figure 13 is modified by providing a special compensating mechanism indicated generally by the character 118 in Figure 14 for driving shaft section 115 of the forward truck, and for driving shaft section 36 of a rear driving truck through shaft sections 119 and 120 and flexible metallic driving couplings 121. Central shaft section 120 is supported from the framework of the car by a suitable hanger and anti-friction bearing 122. The construction of the rear driving trucks is as indicated in Figure 15, substantially the same as the construction of the forward driving truck.

Shaft sections 114 and 119 extend through stuffing boxes 123 (Figure 16) formed in caps 124 of gear casings 113. The inner ends of shafts 114 and 119 are splined to tubular bearing extensions 125 of bevel gears. Extensions 125 are journaled for rotation in bushings 127 which are secured in tubular supporting extensions 128 and 129 of the differential housing 130. Tubular extensions 128 and 129 of housing 130 are supported in anti-friction or ball bearings 131 which in turn are mounted in the caps 124. Formed integrally with the housing 130 is web 132 to which herring bone drive gear 112 is secured by means of rivets 133. Gear 112 meshes with and is driven by herring bone gear 111 as hereinbefore set forth.

Threaded into the housing 130 are two pairs of diametrically opposite cylinder members 135 bored to receive loose fitting reciprocating pistons 136. Threaded into the outer ends of the cylinders 135 are cylinder heads 137. Pistons 136 are secured to the ends of piston rods 138 by means of securing nuts 139. Piston rods 138 are disposed at right angles to each other and are provided with the centrally formed recessed sections 140 so arranged that reciprocation of the piston rods at right angles in relation to shafts 114 and 119 can occur. Each of the piston rods 138 has formed integrally therewith actuating cam surfaces 141 engaged by projections 142 of differential pinions 143. Pinions 143 are provided with the spherical surfaces 144 that seat against cupped spherical surfaces 145 formed in the inner ends of cylinder members 135. Formed in surface 144 of each pinion 143 is a timing slot 146 (Figures 16 and 18) which is adapted to communicate with a segmental fluid groove 147 formed in each surface 145 of cylinder members 135. Drilled from slots 147 to the interior of the cylinders are fluid inlet passages 148. As the respective pistons 136 move inward slots 146 are out of communication with slots 147 and the cylinders are sealed. During the outward movement of the pistons slots 146 are in communication with slots 147 permitting fluid to pass from the interior of housing 130 into the interior of the cylinders. To provide for maintenance of a fluid level within housing 130, drilled fluid conduits 149 (Figure 16) are formed from the periphery of gear 112 through web section 132 to the interior of the housing 130. To provide for convenient assembly of the parts, housing 130 is split in the central plane of cylinders 135 and the sections thereof are secured together by means of securing studs 150 (Figure 19).

In operation of the compensating device so far described, a suitable level of oil or lubricant is maintained in casing 113 around gear 112 and cylinders 135 together with the housing 130 are filled with oil or lubricant. Gear 112 is driven by the gear 111, rotating housing 130 together with pinions 143 and the related parts. Pinions 143 mesh with and drive the bevel gears 126 which in turn drive the shaft sections 114 and 119. As gears 111 and 112 rotate, oil or lubricant is picked up in the teeth of gear 112 and as the teeth mesh at ducts 149, lubricant is forced under pressure through the ducts 149 into the center of the housing. In the housing then oil lubricant passes outward by centrifugal force maintaining a layer of oil around the interior periphery of the housing. So long as shafts 114 and 119 rotate at the same speed, no rotation of the pinions 143 about the piston rods 138 will occur, and the driving torque will be equalized between the front and the rear truck. If, however, the wheels of the trucks are, or become different in diameter through wear, or if due to different conditions of track curvature the diameters of wheels in contact with the rails vary due to the transverse shifting of the wheels, or if due to slippery track the wheels of one truck slip, then shaft sections 114 and 119 will rotate at different speeds and as a result pinions 143 will rotate about the piston rods 138. As a result of this rotation of pinions 143 projections 142 thereof will ride over cam surfaces 141 of piston rods 138 causing a relatively slow reciprocation of the piston rods 138 and pistons 136. This movement is, however, sufficiently slow and the fit of pistons 136 such that the fluid in the cylinders 135 will pass around the edges of the pistons 136 without exerting a substantial resistance to the reciprocation of the pistons. During a portion of the outward movement of pistons 136 a fluid connection will be established from housing 130 and to cylinders, permitting fluid to enter the cylinders as above. Air entrained in the cylinders will accordingly be displaced by fluid under the action of gravity and the cylinders therefore will be maintained full of fluid. When the wheels of one driving truck begin to slip or spin due to loss of traction, the speed of rotation of pinions 143 about piston rods 138 will tend to increase abnormally resulting in a tendency to speed the reciprocation of pistons 136. As the fluid in the cylinders cannot pass rapidly around the pistons during their reciprocation, the reciprocation of pistons 136 and rotation of pinions 143 is resisted, checking the tendency to race the slipping wheels, and at the same time exerting a substantial driving effect on the wheels of the other truck. In this way it will be seen that compensation for ordinary speed differences of the shafts is provided while at the same time complete loss of traction is avoided if the wheels of one truck slip abnormally.

To prevent the lubricant in the interior of housing 130 from feeding outward through ducts 149 through centrifugal force, the construction shown in Figure 16 may be modified as shown in Figure 20 by introducing a check valve 152 in the conduit 149 of spider 132. Valve 152 comprises ball 153 seated under the action of a spring 154. Fluid forced into conduit 149 by the meshing action of gears 111 and 112 will unseat ball 153, spring 154 together with centrifugal force will cause the ball to seat preventing the loss of fluid from the ducts 149.

In the form of compensating mechanisms shown in Figures 16 to 20, the center sections of piston rods 138 pass between the ends of shafts 114 and 119. In Figure 21 a compensating differential mechanism is shown in which the ends of shafts 114 and 119 come into substantial abutment, adapting the mechanism for use to replace standard differential mechanisms in interchangeable differential vehicle axles, as well as in the relation heretofore described. In this form of invention the tubular sleeve sections 125 of differential bevel gears 126 are extended inward into substantial abutment along the splined end sections of the shafts 114 and 119, and journaled thereon is a sleeve 155 on which two pairs of oppositely disposed trunnion members 156 are integrally formed. Slidably keyed to trunnions 156 by means of keys 157 and suitable sliding keyways are sleeves 158, to which pistons 136 of the cylinders 135 are secured by means of securing nuts 139. In this form of the invention it will be noted that the cylinders 135 are formed integrally with the differential housing 130. As above set forth pistons 136 fit loosely in the cylinders 135 to permit the passage of fluid around the pistons during reciprocation thereof. Formed integrally with the pistons 136 are tubular extensions 159 on the ends of which inclined actuating surfaces 159' are formed. Actuating surfaces 159' are engaged by projections 160 formed integrally with tubular extensions 161 of each differential pinion 143. Extensions 161 of pinions 143 are rotatably journaled in suitable bores formed in housing 130 and the pinions are rotatably mounted on sliding sleeves 158. Formed in recessed sections of pinions 143 are actuating protrusions 163 which are adapted to engage inclined actuating surfaces 164 formed on the exterior of sliding sleeves 158. The arrangement of fluid ducts 148 to the interior of cylinders 135 and the arrangement of the timing slots 146 and 147 is the same as the arrangement of these parts shown in Figures 16, 17 and 18. A duct 165 drilled in each pinion 143 permits lubricant to be forced by the meshing action of the pinions with gears 125 into the recessed sections of the pinions.

In operation, the cylinders 135 are maintained full of lubricating fluid or oil in the same manner as set forth in connection with Figures 16 to 20, and the mechanism functions to divide the power equally between shafts 114 and 119. With the differences of speed in rotation of the shafts 114 and 119 incident to normal operation, pinions 143 will rotate slowly about the non-rotatable sliding sleeves 158 and the actuating projections of the pinions will engage inclined surfaces 159 and 164 respectively, reciprocating the pistons 136 slowly in cylinders 135. Under these conditions, the fluid in the cylinders passes around the edges of the pistons without substantially resisting the rotation of pinions 143. Whenever, however, an abnormal difference in relative speeds of shafts 114 and 119 occurs, pinions 143 will tend to rotate at high speeds and the resistance to the reciprocation of pistons 136 then causes a substantial resistance to the rotation of the pinions 143, preventing loss of traction at the driving wheels which are not slipping.

In the operation of vehicles driven by internal combustion engines and in particular in the operation of railway vehicles of this type, it is important that proper means be provided to establish efficient operating temperatures in the engines and transmission. Where hydraulic transmissions are utilized, the maintenance of the fluid in the hydraulic transmission at temperatures for most efficient operation is important. It has been common practice to provide water cooling systems for internal combustion engines in motor vehicles with cooling radiators, and in many instances the transmissions and engines are exposed to the elements so that the efficiency of operation is impaired by accumulations of snow, dirt and ice and by excessive cooling. In accordance with the present invention, the engine transmissions and water cooling radiators are so disposed that they are not exposed to the elements. The transmissions are preferably provided with water jackets and a common system is provided for maintaining both the engine and the transmission at the proper temperature. As shown in Figures 22 to 24 cooling radiators 170 of any usual construction are mounted in castings 171 which are supported from the frame side members 3 by suitable structural iron supports 172. Mounted outside of the radiators 170 in the castings 171 are adjustable control shutters 173 which may be controlled by suitable mechanism from the control cab of the railcar or automatically by thermostat. Castings 171 are connected through vertical air conduits 174 to adjustable gratings 175 in the floor 176 of the car body 1. The inner sides of castings 171 are connected through ducts 177 to outlet 178 of a blower 179. Blower 179 is provided with a rotor 180 which is driven from the shaft of the internal combustion engine 107. The air inlet opening of the blower 179 is connected to a duct casting 181 which is provided at the lower front with an opening 182 to atmosphere in which adjustable shutter 183 under control of the operator is mounted. Duct casting 181 is provided with a vertical branch fitted with adjustable shutters 183' and opening into covering 184 supported on the floor 176 of the railcar and covering the engine which is supported from the car frame work as above set forth. The engine and transmission are preferably completely disposed beneath the floor 176 of the car. Formed in the floor 176 of the car are passages 186 covered by gratings for admission of air from the car body to compartment 185.

Engine 107 is provided with the usual water cooling jacket and drives a water circulation pump in well known manner, and transmission 31 is also preferably provided with a water jacket. The suction side of the engine driven circulation pump is connected through pipes or conduits 188 and 189 to the bottoms of radiators 170, and the discharge side of the water circulation pump is connected to the bottom of the engine jacket. Outlet pipe 190 of the engine jacket is connected through piping 191 to the water inlet connection 192 for the water jacket of the transmission 31. The outlet connection 193 of the jacket for transmission 31 is connected through piping 194 to the top or inlet connections of cooling radiators 170. When a water jacketed transmission is not utilized, the outlet connection 190 of the engine jacket is connected to the inlet connections of the radiators 170. During warm weather, shutters 173 may be opened and shutters 175 and 183' closed so that cooling air is drawn through opening 182 and blown outward over and through radiators 170 through shutters 173 to atmosphere to maintain the water in the system at the desired temperature for efficient operation. The cooled water from the bottom of the radiator is drawn through conduits 189 and 188 by the circulation pump and then forced through the engine and transmission jackets, to the tops of the radiators. The radiating surfaces are so proportioned that under the warmest weather conditions, excessive temperature rises in the engine and transmission will be prevented and so that engine and transmission temperatures will be held at the values necessary for efficient operation, temperatures of about 150 to 160 degrees Fahrenheit being preferably maintained. As the air becomes cooler the shutters 173 and 183 may be partially closed to restrict the cooling effect on the radiators. During cold weather, shutters 173 and 183 may be closed and the shutters 175 and 187 opened. Air from the interior of the car body is then drawn through gratings 187 and the duct casting 181' into the blower and then is forced through the ducts 177 over and through radiators 170 passing upward through the vertical ducts 174 and gratings 175 into the car body. In this way the air from the car body is drawn downward and circulated through the closed compartments 185 passing through blower 179 and over the radiators 170 and then is returned into the car. The excess heat generated in the engine and transmission is in this way utilized to heat the air in the car, and the engine and transmission are at the same time maintained at efficient operating temperatures. In cold weather the engine and transmission may be maintained warm for starting purposes due to their contact with the interior atmosphere of the car which may also be heated by an auxiliary stove as is the usual manner. In this way, trouble incident to starting of the motor and hydraulic transmission in cold weather may be eliminated and at the same time the engine and radiators are completely protected from the elements and clogging thereof by snow, and ice is avoided.

It will be apparent to those skilled in the art that various modifications of my invention may be made by those skilled in the art without departing from the spirit of my invention, and that the various combinations and sub-combinations disclosed are capable of application to various independent uses without departing from the spirit of my invention.

Accordingly, having described preferred embodiments only of my invention, what is desired to be secured by Letters Patent and claimed as new is:

1. A motor driven vehicle comprising a frame; trucks at each end of said frame; means to connect said trucks to said frame in a manner permitting limited universal movement of each truck relative to the frame about fixed points substantially in horizontal alignment; an internal combustion engine and a transmission mechanism on said frame and means to distribute the power of said engine through said mechanism to said trucks, said means including a substantially horizontally extending flexible drive shaft whose axis under normal conditions is in alignment with said points.

2. The combination defined in claim 1 in which the engine and transmission mechanisms are arranged over one of said trucks at opposite sides of the center of universal motion between said truck and the frame.

3. The combination defined in claim 1 in which the transmission mechanism is fluid controlled.

4. A motor driven vehicle comprising a plurality of trucks; each truck including a pair of axles supported on wheels; means to drive all of said axles; an internal combustion engine; a transmission mechanism; and means to distribute the power of said engine to said axles; said means including a differential that permits limited differential motion between the wheels of the trucks but automatically prevents abnormal differential motion.

5. A motor driven vehicle comprising a plurality of trucks; each truck including a pair of axles supported on wheels; means to drive all of said axles; said last named means embodying mechanism to reverse the direction of rotation of said axles; an internal combustion engine; a fluid controlled speed reduction mechanism; and means for distributing the power of said engine between said trucks; said means including a differential that includes fluid means to automatically restrict the differential motion between the wheels of the trucks.

6. A motor driven vehicle including a drive shaft; relatively movable driven shaft sections; a differential housing driven by said drive shaft; differential gears carried by said housing; gears on said shaft sections meshing with said differential gears; fluid means to limit the rotation of said differential gears and means actuated by the means to drive the differential housing to supply fluid to said housing; and means controlled by said differential gears to supply fluid from said housing to said fluid means.

7. The combination defined in claim 6 in which the means to supply fluid to the differential housing includes a check valve to prevent the flow of fluid from said housing.

8. A motor driven vehicle comprising a frame; trucks including driven axles at each end of said frame; said trucks being connected to said frame in a manner permitting limited universal movement between said trucks and frame about fixed points in substantial horizontal alignment; an internal combustion engine on said frame; a transmission mechanism on said frame and flexible shafts connecting said engine to said axles; said shafts extending substantially horizontally under normal conditions and substantially in alignment with said points.

9. The combination defined in claim 8 including a differential arranged between sections of one of said shafts to differentially drive said trucks; said differential including means to yieldingly resist abnormal relative rotation between said sections.

10. A motor driven vehicle, comprising a frame, a truck secured to said frame in a manner permitting relative movement between said truck and frame about a center, a drive shaft supported on said frame in a position low enough so that the axis thereof is approximately coincident with said center, wheel supported axles for said truck, and mechanism between said shaft and said axles for operatively connecting said shaft and axles, said last named mechanism including elements that permit substantially free relative movement between said truck and said frame about said center.

11. The combination defined in claim 10 including a bearing suspended from said frame adjacent said center in which said shaft is journalled.

12. A motor driven vehicle comprising a frame, a truck supporting each end of said frame, said trucks being connected to said frame so as to be capable of universal movement about centers that are in horizontal alinement, a pair of axles resiliently connected to and supporting each truck, a drive shaft for said trucks arranged substantially horizontally and suspended from said frame, said drive shaft being disposed so that it is approximately in alinement with the centers of universal movement of both of said trucks, and mechanism to drive said shaft.

13. The combination defined in claim 12 in which said mechanism includes a differential arranged to divide the power between the several trucks while permitting normal differential movement between the wheels of said trucks.

14. The combination defined in claim 12 in which said mechanism includes a differential provided with means permitting normal differential movement between the wheels of said several trucks, but automatically preventing abnormal differential movement between said wheels.

In testimony whereof I affix my signature.

ALDEN G. RAYBURN.